United States Patent [19]
Van Velzen et al.

[11] Patent Number: 5,489,421
[45] Date of Patent: Feb. 6, 1996

[54] PROCESS FOR PREPARING HYDROXYLAMINE FROM $NO_x$-CONTAINING FLUE GASES

[75] Inventors: Daniel Van Velzen, Brebbia; Heinrich Langenkamp, Cadrezzate; Dimosthenis Papameletiou, Ispra, all of Italy; Håvard Nymoen, Gladbeck, Germany

[73] Assignee: Europaische Atomgemeinschaft (Euratom), Plateau du Kirchberg, Luxembourg

[21] Appl. No.: 211,945

[22] PCT Filed: Oct. 15, 1992

[86] PCT No.: PCT/EP92/02381

§ 371 Date: Apr. 21, 1994

§ 102(e) Date: Apr. 21, 1994

[87] PCT Pub. No.: WO93/08121

PCT Pub. Date: Apr. 29, 1993

[30] Foreign Application Priority Data

Oct. 21, 1991 [LU] Luxembourg .................. 88021

[51] Int. Cl.⁶ ...................................... G01B 21/20

[52] U.S. Cl. .............................. 423/387; 423/235
[58] Field of Search ...................... 423/235, 387

[56] References Cited

U.S. PATENT DOCUMENTS

| | | | |
|---|---|---|---|
| 4,013,430 | 3/1977 | Adachi et al. | 423/235 |
| 4,091,074 | 5/1978 | Gorai et al. | 423/235 |
| 4,126,529 | 11/1978 | DeBerry | 204/151 |
| 4,879,102 | 11/1989 | Hoppe et al. | 423/235 |
| 5,320,816 | 6/1994 | Tsai et al. | 423/235 |

*Primary Examiner*—Wayne Langel
*Attorney, Agent, or Firm*—Sughrue, Mion, Zinn, Macpeak & Seas

[57] ABSTRACT

A process and device are disclosed for preparing hydroxylamine from $NO_x$-containing flue gases. Nitrogen removal from the $NO_x$-containing flue gases by absorption in an aqueous solution of FeII-EDTA and by desorption through vapor stripping of the NA from the thus obtained FeII(NO)-EDTA solution, with admixture of hydrogen, leading to the recovery of an $NO/H_2$ gaseous mixture, is combined with hydroxylamine synthesis by catalytic reduction of NO with hydrogen.

14 Claims, 1 Drawing Sheet

PROCESS FOR PREPARING HYDROXYLAMINE FROM NO$_x$-CONTAINING FLUE GASES

A process and device are disclosed for preparing hydroxylamine from NO$_x$- and, possibly, O$_2$-containing flue gases. Nitrogen removal from the flue gases is combined with hydroxylamine synthesis by catalytic reduction of NO with hydrogen.

This invention makes it possible to combine nitrogen removal from flue gases, which is laid down by law in many countries for environmental reasons, with the commercial production of hydroxylamine, which represents a valuable intermediate product for the production of nylon-6.

Nitrogen removal from flue gases, especially from those found in industrial combustion installations, coal and crude petroleum power stations as well as in the preparation of azotic acids, is very important these days for environmental reasons and is in many countries subjected to strict statutory regulations. The EC guidelines, for instance, lay down that the nitrogen oxides content in the flue gases of industrial power stations and in industrial flue gases are not to exceed 200 to 400 mg/m$^3$. These low limits cannot be observed by proper measures during the combustion process, the so-called primary measures, alone. It is therefore necessary to use a special process for the removal of undesirable nitrogen in so-called nitrogen removal processes in order to fulfil these high demands. The nitrogen removal process that is used the most at present is the nitrogen removal by selective catalytic reduction (SCR), in which the NO$_x$ (i.e. different nitrogen oxides, especially NO, possibly mixed with NO$_2$) nitrogen oxides in the flue gases are catalytically reduced to N$_2$ and H$_2$O in reaction with ammonia (NH$_3$). This reaction usually happens at a temperature of 300° to 400° C. There are several other alternative industrial processes for nitrogen removal, but none of these processes transforms the undesirable nitrogen oxides in a technically acceptable product.

DE-PS 3 406 085 describes an attempt to produce an acceptable product, NO rich gas, during the purification of exhaust gases. It explains a process for nitrogen removal from NO$_x$-containing flue gases by absorption of NO$_x$ nitrogen oxide in aqueous solutions of iron (II) salt with pH values of 0 to 1. However, since the solubility of NO$_x$ in such a solution is known to be extremely low, this process is not workable enough for industrial nitrogen removal.

Other processes have also been suggested in which SO$_x$ and NO$_x$ are removed from flue gases or other absorbent, like Mg(OH)$_2$, Na$_2$SO$_3$, citrates and suchlike, are used as absorbing agents (cf. H. Hasui and H. Omichi, "The Mitsui Wet Process for SO$_2$ and NO$_x$ Removal," Nenryo Kyokai-Shi 55 (1979) 4, 264 to 269; E. Sada, H. Kumazawa, I. Kudo and T. Kondo, "Ind. Eng. Process Des. Dev.," 20 (1981) 3, 46–49; E. Sada, H. Kumazawa, Y. Sawada and T. Kondo, Ind. Eng. Process Des. Dev., 21 (1982) 4, 771–774, and W. Weisweiler, B. Retzlaff and L. Raible, Chem. Eng. Process, 18 (1984) 85–92).

When using absorbents like those the chemical equilibrium is moved to the desired side. At the same time, however, an undesirable oxidation of iron (II) to iron (III) occurs on the basis of the oxygen contents found in all flue gases, which strongly reduces the absorbing power of the absorbent. In addition sulphates form, and their removal is problematic. Normally unhydrated lime is added and potassium sulphate is obtained by precipitation. The Fe(EDTA) complex is lost, however.

On the other hand hydroxylamine (NH$_2$OH) is generally recognized to be a valuable intermediate product for nylon-6 synthesis.

Hydroxylamine is used to prepare cyclohexanonoxim out of cyclohexanone, in which the resulting cyclohexanonoxim is transferred to caprolactam through the Beckmann rearrangement. This caprolactam can be polymerized into a polyamide, namely nylon-6, an extraordinarily valuable synthetic substance.

Therefore it has been a long-lasting endeavor to prepare the hydroxylamine necessary as intermediate material for the preparation of nylon-6 as economically as possible on a commercial scale. One of the most famous synthesis processes is the so-called Raschig process, based on the reduction of ammonium nitrate with a solution of bisulfite and sulphur dioxide. Another famous synthesis process is the so-called BASF process, in which nitrogen oxides NO with gaseous hydrogen are directly reduced to hydroxylamine (cf. DE-PS 1 177 118 and K. Jockers, "Nitrogen" No. 50, November/December 1967, 27–30). In this process a mixture of NO and H$_2$ reacts in an aqueous acid medium in the presence of a platinum or other noble metal catalyst that has been reduced to slurry. To carry out this BASF process industrial quality chemicals are necessary and the NO that is used as a starting material has to be prepared in-situ by oxidation of ammonia. Using already obtained, NO$_x$-containing flue gases is not possible according to the above-cited prior publications.

Other efforts were also made to enable hydroxylamine synthesis from flue gases. For instance, in IT-PS 1 152 229 the use of NO$_x$ and SO$_2$-containing process flue gases as starting material is suggested. This process, however, is restricted to the use of comparatively high NO$_x$ concentrations in the 1% dimension. This means that in order to carry out the process only flue gases of low pressure azotic acid productions can be used.

The U.S. Pat. No. 4 115 523 introduces a process for the preparation of hydroxylamine from NO and H$_2$S from industrial flue gases.

But also in this process high concentrations of NO$_x$ of more than 10 percent by volume are necessary, because only with these concentrations the hydroxylamine synthesis can be satisfactory.

The invention therefore had to find a way for hydroxylamine synthesis from flue gases that are already obtained to enable the commercial and industrial hydroxylamine preparation as a valuable intermediate product for nylon-6 synthesis.

It was determined that according to invention this task can be solved by combining the nitrogen removal from NO$_x$- and possibly oxygen-containing flue gases, which is already necessary for environmental reasons, with the catalytic reduction of the thus gained NO by means of hydrogen in the framework of a commercially feasible overall process. Important is here that the nitrogen removal from the NO$_x$- and also possibly from the oxygen-containing flue gases by absorption of NO$_x$ in an aqueous solution of FeII-EDTA is carried out at a comparatively low temperature and that the complexly absorbed NO is desorbed and concentrated from the aqueous solution of FeII(NO)-EDTA at an increased temperature by vapor stripping under induction of electrolytically generated hydrogen, so that the thus obtained gaseous mixture after removal of the vapor by condensation contains NO and H$_2$ in the for the catalytic synthesis necessary proportion of 35 to 65 percent by volume. This gaseous mixture is directly suitable as charging gas for the commercial preparation of hydroxylamine by catalytic reduction.

Subject of the invention is a process for preparing hydroxylamine from $NO_x$- and possibly $O_2$-containing flue gases by combining nitrogen removal from the $NO_x$- as well as the possibly $O_2$-containing flue gases with hydroxylamine synthesis by catalytic reduction of NO with hydrogen. This process is characterized by its steps, which are the following:

(a) a $NO_x$-containing flue gas is introduced into the bottom section of an absorber, where the $NO_x$ which is contained in the flue gas is absorbed at a comparatively low temperature in countercurrent contact with an aqueous FeII-EDTA solution which was inserted into the head of the absorber, a FeII(NO)-EDTA complex being produced thereby which is dissolved in the aqueous solution and which is removed as bottom product from the absorber together with the aqueous solution that contains it and after going through a heat regenerator to increase its temperature it is inserted as head product in a desorber, while the flue gas, now free from $NO_x$, is removed overhead from the absorber;

(b) from the aqueous solution of the FeII(NO)-EDTA complex with increased temperature, which is inserted in the head of the desorber, the NO is desorbed in countercurrent contact with the vapor that was transferred from a reboiler into the bottom section of the desorber, and with hydrogen that was transferred from an electrolyzer. The thus obtained aqueous solution containing the dissolved FeII-EDTA complex is removed as bottom product from the desorber and led back into circulation in the upper section of the absorber via an electrolyzer to reduce the possibly contained FeIII-EDTA to FeII-EDTA and via a heat regenerator as well as a condenser for the step-by-step decreasing of its temperature, and (c) the gaseous mixture of NO, $H_2$ and water vapor which was removed overhead from the desorber is led to the reboiler of the direct catalytic hydroxylamine synthesis after the water vapor has been removed in a condenser and the condensed vapor has been returned to the reboiler.

According to the invented process it is surprisingly easy and economical to effectively remove nitrogen from $NO_x$- and possibly oxygen-containing flue gases by absorption and by complex absorption of $NO_x$ in an aqueous FeII-EDTA solution, without the occurrence of a reduction to N2, as is the case in most known nitrogen removal processes. On the other hand, according to the invented process the $NO_x$ that is obtained after the desorption can be directly catalytically reduced to hydroxylamine after the concentration of $NO_x$ is mixed with proportionally added amounts of hydrogen, without having to use some valuable starting material like ammonia and suchlike. Therefore the total process according to invention can be carried out very economically. The process according to invention therefore can also be carried out successfully when the flue gases that are used as starting material contain further oxygenating components like oxygen and/or $NO_2$, which cause an at least partial oxidation of the aqueous FeII-EDTA solution into an aqueous FeIII-EDTA solution.

According to the invention this circumstance is taken into account by electrolytically regenerating the partially oxygenated aqueous absorbing solution while at the same time hydrogen is absorbed, which is directed in such a way that there is a right amount of hydrogen for the commercial production of hydroxylamine for the desorbed NO. According to the invented process even very low concentrations of $NO_x$ of even less than 500 $mg/m^3$ can be concentrated for a workable hydroxylamine synthesis.

As mentioned above the invented process offers many advantages over the comparable processes of the state of art that were known until now. Since some types of flue gases from which nitrogen has to be removed contain considerable amounts of nitrogen oxides ($NO_2$) next to 3 to 5 percent by volume of oxygen, it is very important that the invented process can also be used with flue gases which contain $NO_2$. This ecologically harmful component is produced in particular in the preparation of azotic acids and the flue gases contain considerable concentrations of $NO_2$. The typical concentrations of $NO_x$ in the flue gas leaving the last absorber of an installation for the preparation of azotic acids can be as high as 4000 ppm, while the $NO_2$ content can be 50% of the total concentration of $NO_x$.

These amounts of NO constantly cause problems, which manifest themselves in brown $NO_2$ plumes coming out of the chimney of an azotic acids production plant. The total $NO_x$ content in the flue gas has to be reduced to 200 ppm before being let off into the atmosphere. It is generally accepted that the $NO_2$ content has to be reduced to less than 75 to 100 ppm in order to produce a colorless smoke trail.

When using the process according to invention on such flue gases, the nitrogen dioxide ($NO_2$) contained in the flue gas is transformed into nitrogen oxide NO according to the following equation during the absorption-complex-building process:

$$NO_2 + FeII\text{-}EDTA + 2H^+ \rightarrow FeII(NO)\text{-}EDTA + 2\ FeIII\text{-}EDTA + H_2O$$

The nitrogen dioxide ($NO_2$) is dissolved in the scouring solution and then reduced to nitrogen oxide (NO) by FeII, which builds the corresponding nitrosyl complex FeII(NO)-EDTA. The NO can be released from this complex in a high concentration. The thus produced FeIII-EDTA is reduced to the active FeII-EDTA in an electrolyzer. This has as a result that the $NO_2$ content, which was originally present in the flue gas, is transformed into NO, which in highly concentrated form is very valuable for the preparation of the $NO/H_2$ mixture for hydroxylamine synthesis. That this reaction really occurs when the process is carried out according to invention is demonstrated in the laboratory tests described below in examples 2 and 3.

Since the absorption of $NO_x$ in the absorber is more effective when the absorption solution is at a lower temperature in the process according to invention, the absorption solution is cooled down to a temperature of 20° to 40° C., preferably 30° C., before being inserted into the absorber. This increases the absorbing power of the absorption solution with respect to the workings at a working temperature of 50° C. at least by a 3.3 factor (at 50° C. the equilibrium constant is 287 $bar^{-1}$ and at 35° C. the equilibrium constant is 929 $bar^{-1}$). While passing through the absorber the NO content of the inserted flue gas decreases from an initial 500 ppm, for instance, to 100 ppm, for instance, and the concentration of the FeII(NO)-EDTA complex in the enriched absorption solution is, for instance, 12.5 mMol/l, i.e. there is a 0.25 transformation degree.

On the other hand the desorption of NO from the FeII(NO)-EDTA complex in the desorber is determined by the value of the equilibrium constants at higher temperatures, which are defined by the following equation:

$$Kp = \frac{y}{p \times (1-y)} = 9{,}58 \times 10^{-9} \exp(7792/T)$$

in which y is the transformation degree and p the partial pressure of NO (in bar).

At 100° C. the equilibrium constant is 11.3, i.e. the maximum reachable partial pressure of NO during desorption is restricted to a value of less than 0.05 bar. By using a condensable inert gas, like e.g. water vapor, high concentrations of NO can be reached after removal of the inert gas by condensation. By using this method of vapor stripping according to invention high concentrations of NO can be reached after desorption, which are extremely advantageous for the practical hydroxylamine synthesis.

Subject of the invention is further a device for carrying out the process described above. This device is characterized by the fact that it contains an absorber in the bottom section of which the $NO_x$- and possibly $O_2$-containing flue gas is inserted and from which the flue gas, freed from $NO_x$, is removed overhead.

a heat exchanger in the bottom section of which the FeII(NO)-EDTA complex-containing aqueous solution is inserted in order to increase its temperature to a value close to its boiling point, this solution being then removed overhead and inserted into a desorber, while the hot regenerated aqueous FeII-EDTA solution which was extracted from an electrolyzer and inserted into the head of the heat regenerator, is removed as bottom product after cooling down in the heat exchanger and is led via a cooler to the head of the absorber;

a desorber in the top section of which the heated aqueous FeII(NO)-EDTA complex solution is inserted and in countercurrent contact with the hydrogen and water vapor introduced in the bottom section of the desorber is freed from the complexly absorbed NO at an increased temperature. Afterwards the NO, $H_2$ and water vapor mixture that is created in the absorber is removed overhead and—after removal of the vapor in a condenser and returning the condensed water vapor into a reboiler in which the vapor is produced that is led into the desorber—is directly led to the catalytic hydroxylamine synthesis, while the aqueous FeII-EDTA solution which was removed from the desorber as bottom product is led to an electrolyzer, and an electrolyzer which consists of an anode section and a cathode section. The aqueous FeII-EDTA solution which is removed from the desorber is inserted into the cathode section to reduce the possibly contained FeIII-EDTA to FeII-EDTA while at the same time building hydrogen which is inserted in the bottom section of the desorber. The regenerated aqueous FeII-EDTA solution is extracted from the cathode section at increased temperature in view of step-by-step cooling and is led to the heat exchanger and finally via the cooler into the absorber, while the oxygen that is produced in the anode section is removed.

Figure 1:
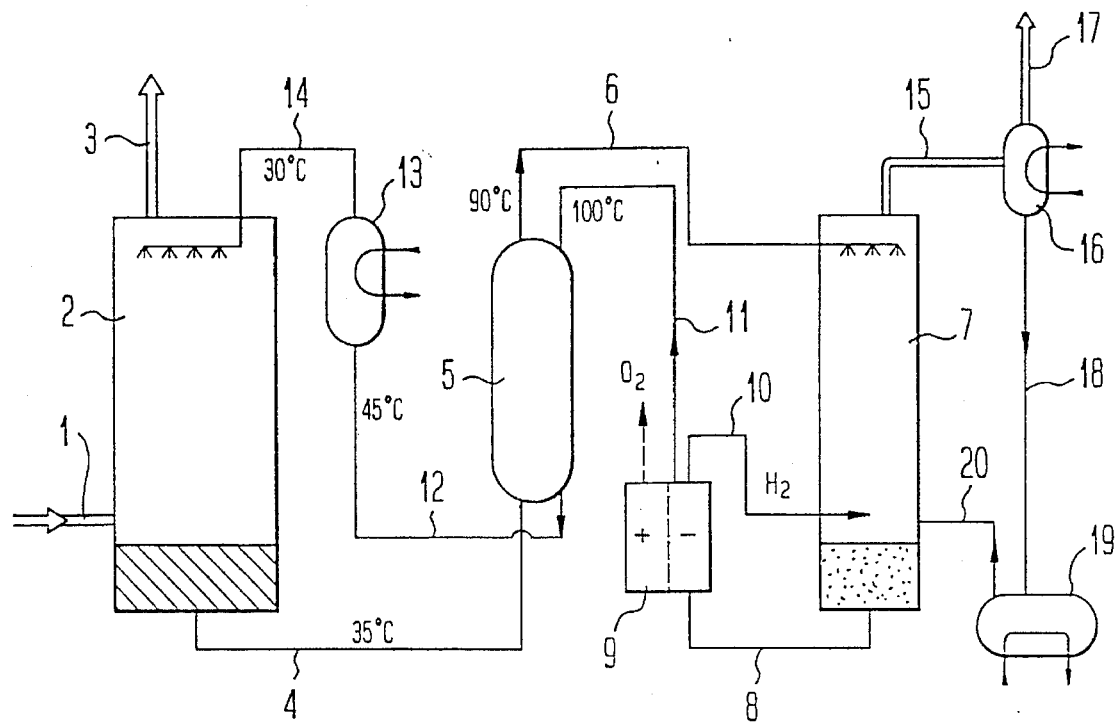
FIG. 1 shows the diagrammatic course of the process according to invention and the diagrammatic structure of the device according to invention for preparing hydroxylamine out of $NO_x$- and possibly oxygen-containing flue gases in the form of a schematic block diagram.

The invention is explained in more detail below with an exemplary form of execution, as diagrammatically shown in FIG. 1. This form of execution shows a typical example for a possible industrial use for a pilot plant industry.

The invention is explained in more detail in the following examples with reference to the enclosed drawings with preferred forms of execution, without being limited to them.

EXAMPLE 1

In this example 10,000 $Nm_3/h$ of flue gas with a 500 $mg/m^3$ $NO_x$ content are treated. The inserted flue gas has already been desulfurized according to one of the usual wet FGD processes. The temperature of the inserted flue gas is 50° C. and it contains less than 100 $mg/m^3$ $SO_2$.

The absorber (2) used consists of a filled column with a 1.4 m diameter. The flue gas current (1) is inserted in the bottom of the absorber (2) and is put in countercurrent contact with the reactive absorption solution which was inserted at the head of the absorber. This solution consists of an aqueous solution that contained 50 mMol/l FeII-EDTA complex (EDTA= ethylene diamine tetracids). The pH value of the solution is kept constant between 2.8 and 3.0. The solution is inserted into the head of the absorber (2) with a 14 $m^3/h$ flow rate through a suitable flow distribution system.

It is advantageous to cool down the absorption solution to 30° C. before inserting it into the absorber (2). This causes the working temperature to decrease from 50° C. to 35° C., which causes the absorbing capacity of the solution to increase by a 3.3 factor (at 50° C. the equilibrium constant is 287 $bar^{-1}$ and at 35° C. the equilibrium constant is 929 $bar^{-1}$).

The $NO_x$ content of the flue gas decreases from 500 to 100 ppm while the gas passes through the absorber (2), i.e. the purified flue gas (3) that was removed from the absorber (2) now contains only 100 ppm $NO_x$. The absorption solution that was inserted into the head of the absorber (2) is free of NO, while the enriched FeII(NO)-EDTA complex solution at the bottom of the absorber (2) contains a 12.5 mMol/l concentration, i.e. there is a 0.25 conversion degree.

After the enriched extraction solution is removed from the absorber (2) it is inserted into the bottom of the heat exchanger (5) through the main (4). A liquid-liquid heat exchanger is preferred to bring the temperature of the enriched absorption solution to a value which is as close as possible to the boiling point of the solution. At the same time the hot absorption solution, free of NO, is cooled down to the lower temperature of the absorber (2) in this heat exchanger (5) before returning to the absorber (2). This operation can preferably be carried out in a classical shell and tube heat exchanger, in which the cool solution flows through the shell while the hot solution flows through the tubes. The temperature difference ($\Delta T$) between the hot and cool side of the heat exchanger (5) is usefully in the range of 5° to 15° C., preferably 10° C.

The heat transmission is considerable in this case, since 14 t/h of an aqueous solution have to be heated from 35° C. to 90° C. This means that there is a 1060 kW heat transmission rate. To reach this heat transmission rate a heat exchanger surface of about 120 $m^2$ is necessary.

The cool, of NO depleted solution leaves the heat exchanger at a temperature of 45° C. This liquid flow has to be cooled down further to 30° C. This cooling occurs in a cooler 13, which is preferably a second heat exchanger. The cooler side of this unit is supplied with coolant almost at room temperature. In this case there is a 240 kW heat transmission rate, the temperature difference $\Delta T$ is smaller than the temperature difference used in the main heat exchanger 5, and it can lie in the 3° to 8° C. range, preferably at 5° C. The heat exchanger surface necessary in the cooler 13 is therefore only about 50 $m^2$.

The NO enriched absorption solution, heated to 90° C. in the heat exchanger (5), is inserted through the main (6) into the head of a desorber (7). In this desorber (7) the FeII-EDTA complex is regenerated and the complexly absorbed NO is released in concentrated form. The desorber (7) also preferably consists of a filled column. The diameter of this column can be a lot smaller than that of the absorber (2) and it can, for instance, be 0.3 m.

The NO enriched absorption solution, which has been heated while passing through the liquid-liquid heat exchanger (5) at, for instance, 90° C., is led into the desorber (7) in countercurrent to the hydrogen which is inserted through the main (10) in the bottom section of the desorber (7) with a flow rate of, for instance, 7.2 $Nm^3/h$. This hydrogen is produced in an electrolyzer (9). Furthermore, water vapor is inserted through the main (20) into the bottom section of the desorber (7). The water vapor is produced in a reboiler (19). The volumetric flow rate of the water vapor has to be guided or controlled with care, and in this case it cannot be lower than 195 $Nm^3/h$, corresponding to 160 kg/h.

In this way a gaseous mixture is produced at the head of the column (7), which has a temperature of close to 100° C. The NO content of this gaseous mixture is 1.9 percent by volume, the $H_2$ content is 3.5 percent by volume and the rest is water vapor. This gaseous mixture is removed from the head of the desorber (7) through the main (15) and led through a condenser (16) in which the total amount of water vapor condenses, which is led through the main (18) into the reboiler (19). The gaseous mixture that is removed from the condenser (16) through the main (17) at a flow rate of 11.1 $Nm^3/h$ consists of 35 percent by volume of NO and 65 percent by volume of $H_2$. This gaseous mixture can be used directly for the commercial production of hydroxylamine by catalytic reduction of nitrogen oxide with hydrogen according to the BASF process.

Because most of the industrial flue gases contain of 3 to 5 percent by volume of oxygen, an undesirable oxidation from FeII-EDTA to FeIII-EDTA occurs when the FeII-EDTA complex comes in contact with the flue gas which contains this oxygen in the absorber (2). Therefore it is imperative that this oxygenated complex be reduced to FeII-EDTA complex before it is inserted in the absorber (2). This reduction preferably occurs by electrolytic cathodic reduction.

The aqueous absorption solution, free of NO, which is removed from the bottom of the desorber (7) is therefore properly inserted through the main (8) into the cathode section of an electrolytic cell (electrolyzer (9)). It is advantageous to carry out the electrolysis at a higher temperature, because that makes it possible to keep the tension of the electrolytic cell lower. For this reason the electrolytic cell, i.e. the electrolyzer (9), is arranged between the bottom of the desorber (7) and the hot side of the heat exchanger (5).

The oxidation rate of the FeII-EDTA complex in the absorber (2) can be estimated as follows: laboratory tests show that the oxidation rate is about 10%/h. In this example this corresponds to an FeII-EDTA production rate of 70 Mol/h. Therefore a current of about 2 kA is needed for the electrolytic reduction of this liquid flow in the electrolyzer (9).

The hydrogen that is needed for the preparation of the hydroxylamine synthesis gaseous mixture in the desorber (7) is also produced in the electrolyzer (9). Since the NO removal rate from the aqueous absorption solution in the desorber (7) was 175 Mol/h (3.9 $Nm^3/h$) in this example, this means that for the preparation of a 65 percent by volume $H_2/35$ percent by volume of NO mixture 323 Mol/h (7.2 $Nm^3/h$) hydrogen have to be produced. The current which is necessary for this hydrogen production (at a current efficiency of 90%) is 20 kA.

The total capacity of the electrolytic cell (9) is thus 22 kA. If one assumes that the current density is 2 $kA/m^2$, it follows that the electrode surface in the electrolyzer (9) has to be 11 $m^2$. The electrolyzer used has to consist of an anode section and a cathode section, and it has to contain a membrane of a diaphragm made out of a suitable material as a separative element.

In the anode section of the electrolyzer (9) a total amount of 4.1 $Nm^3/h$ of oxygen is produced out of the hydroxonium ions. This hydrogen is removed from the anode section of the electrolyzer.

The energy consumption of an electrolytic cell is about 66 kW, resulting from a 22 kA current and a 3 V cell tension.

EXAMPLE 2

A 300 ml washing bottle contains 100 ml of a solution which contains a 60 mMol/l concentration of FeII-EDTA. The initial pH value of the solution is 2.54, the temperature is 21° C. A flow of gas of 47 l/h is led through the solution. The gas consists of nitrogen with 170 ppm $NO_2$, 60 ppm NO and 3 percent by volume of oxygen. The total amount of $NO_x$ of the gases that leave the washing bottle is continuously monitored. After a very short period of time the $NO_x$ concentration at the exhaust decreases to a value of close to 0. The flow of gas is maintained for 30 minutes, the $NO_x$ content of the escaping gas remains at a value of close to 0. Then the flow of gas is stopped.

Figure 2:
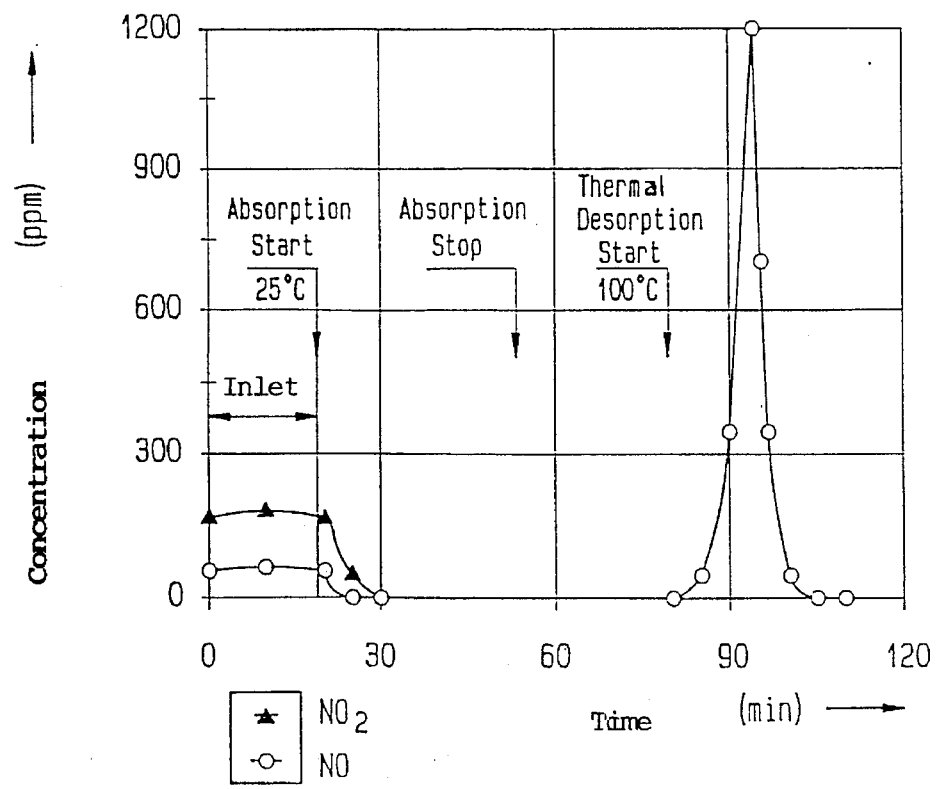
FIG. 2 shows in a diagrammatic view the course of the concentrations of NO and $NO_2$ while the process according to invention is carried out following example 2 described below.

The washing bottle is then placed in an oil-bath of 100° C. and 47 l/h of nitrogen (free of nitrogen oxides) is led through the solution inside the washing bottle. The escaping gas shows a very high NO peak with a maximum concentration of 1200 ppm. No $NO_2$ could be detected. The integration of the established peak shows that the total amount of removed NO corresponded to the total amount of absorbed NO+$NO_2$. The pH value of the solution increased from 2.54 to 2.76 during the test. The course of the NO and $NO_2$ concentrations in the exhaust gas during this test has been diagrammatically depicted in FIG. 2 of the enclosed drawings.

EXAMPLE 3

A 60 mMol/l FeII-EDTA-containing solution was inserted into the head of a laboratory sieve plate column with a height of 50 cm and an inside diameter of 3 cm. In countercurrent to the solution a gas, flowing from bottom to top, was inserted with a constant rate of 60 l/h. The gas consisted of nitrogen with 3 percent by volume of oxygen and 1000 ppm nitrogen oxides. The $NO_2$ content was 300 ppm, the NO content was 700 ppm.

The flow rate of the solution was kept at 1 l/h. The gas that escaped from the column was continuously monitored for its $NO_x$ content. The escaping gas was free of $NO_x$. All nitrogen oxides had been absorbed. Determining the reducible nitrogen content of the solution showed a 2.3 mMol/l concentration.

The reduction of the liquid flow to 500 ml/l did not lead to a change in the $NO_x$ content of the escaping gas, which remained at a value of close to 0. The reducible nitrogen content of the solution increased to 4.0 mMol/l.

We claim:
1. A process for preparing hydroxylamine from $NO_x$-containing flue gases by nitrogen removal from the flue gases combined with hydroxylamine synthesis by catalytic reduction of NO with hydrogen, comprising the steps of:

(a) inserting a $NO_x$-containing flue gas into the bottom section of an absorber, inserting an aqueous FeII-EDTA solution into the head section of the absorber, absorbing the $NO_x$ contained in the flue gas at a comparatively low temperature by countercurrent contact of the flue gas with the aqueous FeII-EDTA solution to form a FeII(NO)-EDTA complex dissolved in the aqueous solution, removing the complex together with the aqueous solution from the absorber as bottom product, inserting the complex and the aqueous solution into a desorber as head product via a heat exchanger to increase the temperature thereof, and removing the flue gas freed of $NO_x$ overhead from the absorber, (b) inserting water vapor and hydrogen into the bottom section of said desorber, and desorbing NO from the aqueous solution of the FeII(NO)-EDTA complex by countercurrent contact with the water vapor and with the hydrogen to form a solution containing dissolved FeII-EDTA complex, removing the solution containing dissolved FeII-EDTA complex from the desorber as bottom product and feeding the bottom product back into the upper section of the absorber via an electrolyzer for reducing FeIII-EDTA to FeII-EDTA and via a heat exchanger and a cooler for step-by-step lowering of the temperature of the bottom product, and (c) removing overhead from the desorber a gaseous NO, $H_2$ and water vapor mixture, removing water vapor from the mixture in a condenser and returning the water vapor to the reboiler, and leading the gaseous mixture of NO and hydrogen to direct catalytic hydroxylamine synthesis by catalytic reduction of the NO with hydrogen.

2. The process according to claim 1, wherein the absorption of $NO_x$ from the flue gas in the absorber is carried out at a temperature ranging from 25° to 35° C., and the desorption of NO from the aqueous FeII(NO)-EDTA solution in the desorber is carried out at a temperature ranging from 80° to 100° C.

3. The process according to claim 1 or 2, wherein the flue gas is a desulfurized flue gas with a $NO_x$ content of 200 to 4,000 ppm, and a $SO_2$ content of less than 100 mg $SO_2/m^3$ and a temperature for 50° C.

4. The process according to claim 1 or 2, wherein the flue gas contains a mixture of NO and $NO_2$.

5. The process according to claim 1 or 2, wherein the gaseous mixture leaving the desorber contains about 35 percent by volume NO and 65 percent by volume $H_2$ after condensation and removal of the water vapor.

6. The process according to claim 1 or 2, wherein the heat exchanger is a shell and tube heat exchanger, the temperature difference between the hot and the cool side of the heat exchanger ranging from 5° to 15° C.

7. The process according to claim 1 or 2, wherein the heat exchanger is a cooler, the temperature difference between the warmer and the cooler side of the heat exchanger being between 4° and 8° C.

8. The process according to claim 1 or 2 wherein the pH value of the aqueous solution in the absorber is kept constant at between 2.8 and 3.0.

9. The process according to claim 2, wherein the absorption of $NO_x$ from the flue gas in the absorber is carried out at a temperature of 30° C.

10. The process according to claim 2, wherein the desorption of NO from the aqueous FeII(NO)-EDTA solution in the desorber is carried out at a temperature of 90° C.

11. The process according to claim 3, wherein the flue gas is a desulfurized flue gas with a $NO_x$ content of 500 ppm.

12. The process according to claim 4, wherein the flue gas contains 3 to 5 percent by volume of $O_2$.

13. The process according to claim 6, wherein the temperature difference between the hot and the cool side is 10° C.

14. The process according to claim 7, wherein the temperature difference between the warmer and the cooler side is 5° C.

* * * * *